US007171582B2

(12) United States Patent
Henninger

(10) Patent No.: US 7,171,582 B2
(45) Date of Patent: Jan. 30, 2007

(54) METHOD FOR CONTROLLING A SAFETY-CRITICAL SYSTEM WHICH HAS A MICROCONTROLLER

(75) Inventor: Michael Henninger, Kelkheim (DE)

(73) Assignee: Siemens Aktiengesellschaft, Munich (DE)

( * ) Notice: Subject to any disclaimer, the term of this patent is extended or adjusted under 35 U.S.C. 154(b) by 633 days.

(21) Appl. No.: 10/324,060

(22) Filed: Dec. 20, 2002

(65) Prior Publication Data

US 2003/0140265 A1 Jul. 24, 2003

(30) Foreign Application Priority Data

Dec. 20, 2001 (DE) .............................. 101 63 153

(51) Int. Cl.
*G06F 11/00* (2006.01)
*G05D 23/00* (2006.01)
*H02H 5/04* (2006.01)
*G08B 29/00* (2006.01)
*G01K 7/00* (2006.01)

(52) U.S. Cl. .............................. 714/5; 701/39; 701/43; 701/97; 700/26; 700/79; 700/292; 700/299; 702/132; 361/103; 340/507; 340/584

(58) Field of Classification Search ................ 714/100, 714/1, 2, 4, 5, 8, 10, 14, 24; 713/300, 310, 713/320, 324, 340; 700/2, 11, 19–23, 26, 700/27, 79, 81, 291, 292, 299; 701/36, 39, 701/41, 43, 97; 326/9, 14; 702/99, 130, 702/132; 307/96, 97, 117; 340/507, 584; 318/563; 123/339.15; 361/1, 18, 23–25, 361/30, 31, 33, 103

See application file for complete search history.

(56) References Cited

U.S. PATENT DOCUMENTS

| | | | | | |
|---|---|---|---|---|---|
| 4,561,296 A | * | 12/1985 | Guagliumi et al. | ........ | 73/118.1 |
| 5,285,344 A | * | 2/1994 | Heitzmann | ................... | 361/22 |
| 5,379,230 A | * | 1/1995 | Morikawa et al. | ............ | 702/57 |
| 5,723,958 A | * | 3/1998 | Boll et al. | ................... | 318/432 |
| 5,730,103 A | * | 3/1998 | Takizawa et al. | ........... | 123/333 |
| 5,835,885 A | * | 11/1998 | Lin | ............................ | 702/99 |
| 5,940,786 A | * | 8/1999 | Steeby | ....................... | 702/132 |
| 6,112,135 A | * | 8/2000 | Peterson et al. | ............ | 700/293 |
| 6,172,611 B1 | * | 1/2001 | Hussain et al. | ............. | 340/584 |
| 6,237,112 B1 | * | 5/2001 | Yoo et al. | ...................... | 714/30 |
| 6,308,121 B1 | * | 10/2001 | Ulm | .............................. | 701/35 |
| 6,393,374 B1 | * | 5/2002 | Rankin et al. | ............. | 702/132 |
| 6,496,346 B1 | * | 12/2002 | Bruckner | .................... | 361/103 |
| 6,535,798 B1 | * | 3/2003 | Bhatia et al. | ............... | 700/293 |

(Continued)

Primary Examiner—Crystal J. Barnes
(74) Attorney, Agent, or Firm—Morrison & Foerster LLP

(57) ABSTRACT

The invention relates to a method for controlling a safety-critical system, in particular of a motor vehicle, which includes a microcontroller. The microcontroller controls and/or regulates the operating sequences of the safety-critical system, and the microcontroller is composed of a microprocessor and at least one peripheral microprocessor device. In a method for controlling a safety-critical system in which disruption to the operational reliability is to be prevented by changes in the molecular movement of the carrier of the microprocessor, the chip temperature of a chip which is provided with the microprocessor and peripheral device together is measured during an operating sequence and/or program sequence and compared with a maximum permitted chip temperature of the microcontroller. The operating sequence and/or the program sequence is controlled as a function of the temperature comparison.

5 Claims, 2 Drawing Sheets

U.S. PATENT DOCUMENTS 6,724,665 B2 * 4/2004 Scheuerlein et al. ... 365/189.12
6,735,546 B2 * 5/2004 Scheuerlein ................ 702/132
2002/0183902 A1 * 12/2002 Koerner et al. ............... 701/29
2003/0110423 A1 * 6/2003 Helms et al. ............... 714/100

* cited by examiner

METHOD FOR CONTROLLING A SAFETY-CRITICAL SYSTEM WHICH HAS A MICROCONTROLLER

CLAIM FOR PRIORITY

This application claims priority to Application No. 10163153.7 which was filed in the German language on Dec. 20, 2001.

TECHNICAL FIELD OF THE INVENTION

The invention relates to a method for controlling a safety-critical system, and in particular, to a motor vehicle, which has a microcontroller.

BACKGROUND OF THE INVENTION

Operating sequences of a motor vehicle are controlled or regulated by control units whose core is a microcontroller. The microcontroller contains control data which the control program requires in order to ensure the operating sequence of specific devices of the vehicle. Moreover, during the service life of a control unit the operating parameters of the device which is to be controlled by this control unit may also change and therefore need to be continuously determined again and stored in the microcontroller. Moreover, it is also necessary to adapt the control programs to changes in the operating parameters of the device to be controlled.

The adaptation of the large amount of data must be carried out during the service life of the motor vehicle in such a way that the operating reliability of the motor vehicle is not put at risk as an incorrect control of the microprocessor can lead to situations in a motor vehicle which are hazardous for the traffic.

As the mode of operation of the microcontroller depends decisively on the molecular movement of the semiconductor material which bears the electronic parts, temperature changes in the environment of the microcontroller lead to malfunctions of the microcontroller and thus to disruption in the operating sequences of the motor vehicle.

SUMMARY OF THE INVENTION

The invention relates to a method for controlling a safety-critical system, in particular of a motor vehicle, which contains a microcontroller, the microcontroller controlling and/or regulating the operating sequences of the safety-critical system, and the microcontroller being composed of a microprocessor and at least one peripheral microprocessor device.

The invention discloses a method for controlling a safety-critical system such as a motor vehicle, in which disruption to the operating reliability is prevented by changes in the molecular movement of the carrier of the microprocessor.

In one embodiment of the invention, the chip temperature of a chip which is provided with the microprocessor and the peripheral device together is measured during an operating sequence and/or program sequence and compared with a maximum permitted chip temperature of the microcontroller, the operating sequence and/or the program sequence being controlled as a function of the temperature comparison.

One advantage of the invention is that by measuring the chip temperature of the chip which is composed of the semiconductor material it is possible to draw conclusions about the molecular movement of the semiconductor material. In this way it is easy to determine when the microcontroller is moving in the region in which its operating sequences are disrupted.

Thus, in one embodiment of the invention, it is possible to interrupt the operating sequence and/or program sequence when the maximum chip temperature is exceeded. In another embodiment, the measured chip temperature is supplied to an external evaluation device which caries out the temperature comparison and blocks the operating sequence and/or program sequence of the microcontroller by supplying an external signal. In this context, the external evaluation device can use software to decide whether the microcontroller is to continue to operate.

Another embodiment makes it possible for the measured chip temperature on the chip itself to be converted into a voltage change, the temperature comparison being carried out by a comparator circuit which is arranged in the microcontroller itself. By carrying out this blocking using hardware, which is a comparator circuit in the simplest case, the mode of operation of the microcontroller is immediately interrupted.

The chip temperature is advantageously set below the maximum chip temperature by regulating the operating sequences of the safety-critical system. This approach can be used favorably, for example, in systems which are themselves responsible for the increasing ambient temperatures of the microcontroller.

In another embodiment, when the permitted chip temperature is exceeded, the microcontroller which is arranged in the direct vicinity of a device which produces a power loss actuates the device which produces the power loss, in such a way that the power loss is reduced and as a consequence the chip temperature is decreased. This procedure ensures that, in a microcontroller which continuously operates at the maximum junction temperature, the safety-critical system can remain operational and malfunctions of the motor vehicle are prevented.

In still another embodiment, the reprogramming of a flash memory which is arranged on the chip and forms the peripheral microprocessor device is monitored as a function of the chip temperature. As the maximum flash temperature is monitored on the basis of this temperature monitoring, reliable data retention is ensured when flashing occurs. If the controller is to be flashed again using a diagnostic tool when it is in service, the temperature of the controller chip can be interrogated by means of software, and when the maximum flash temperature is exceeded flashing can be prevented. Flashing of the controller at interfaces, for example the JTAG interface, can be prevented by means of hardware on the chip.

The use of a control loop also enables fabrication errors, for example batch fluctuations, to be compensated.

Direct measurement of the temperature of the chip is conceivable not only for motor vehicles but also for other industrial applications.

BRIEF DESCRIPTION OF THE DRAWINGS

The invention permits numerous embodiments. One of these will be explained in more detail with reference to the figures illustrated in the drawings, in which.

DETAILED DESCRIPTION OF THE INVENTION

Figure 1:
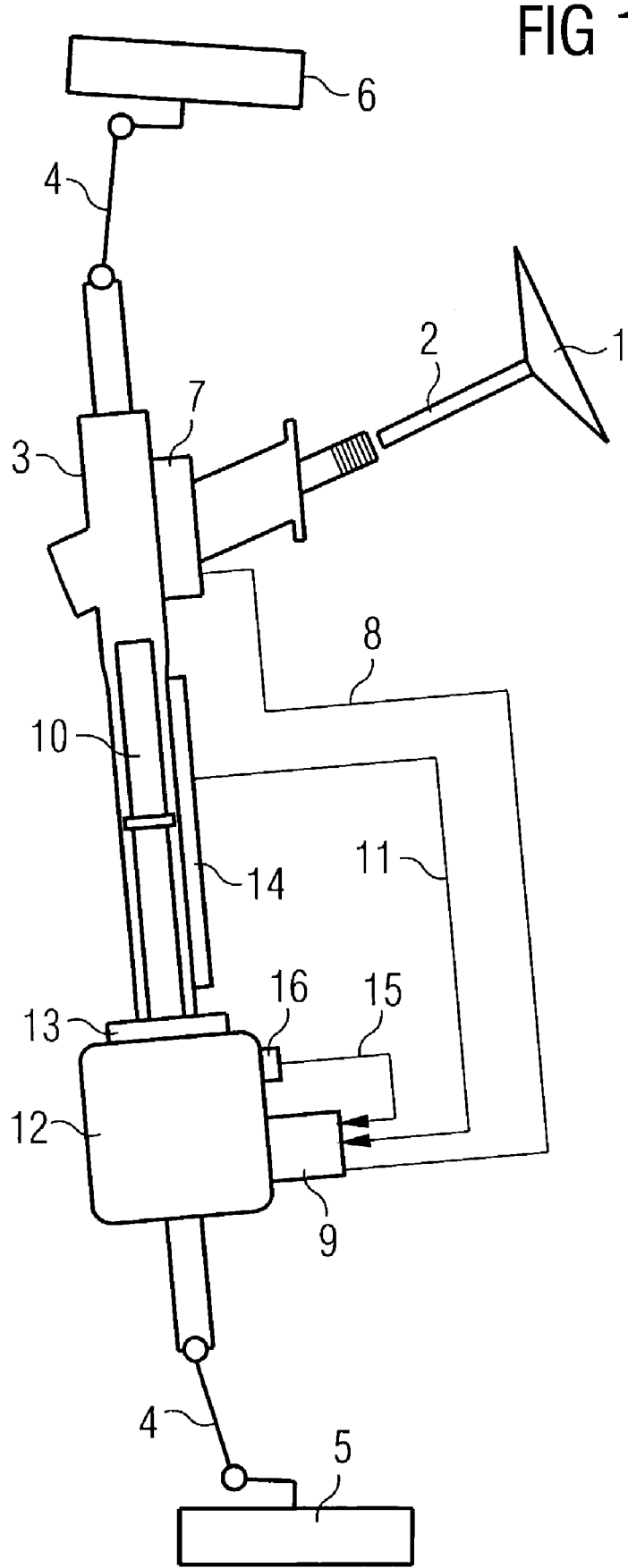
FIG. 1 shows an electric power steering system.

The invention will be explained by reference to the example of an electric power steering system. A steering column 2 which supports the steering wheel 1 engages in a steering gear 3 which moves the two front wheels 5 and 6 of a motor vehicle (not illustrated in more detail) via a steering linkage 4. A steering torque sensor 7, which is connected to a control unit 9 via the line 8, is arranged on the steering column 2. A linear travel sensor 10, which outputs sensor signals, which correspond to the rotational angle of the steering column 2, to the control unit 9 via the line 11 is arranged on the steering gear 3. An electric motor 12 is connected to the toothed rack 14 of the steering gear 3 via a recirculating ball mechanism 13. Furthermore, the position of the electric motor 12 which is detected by a motor position sensor 16 is signaled to the control unit 9 via a further line 15.

Figure 2:
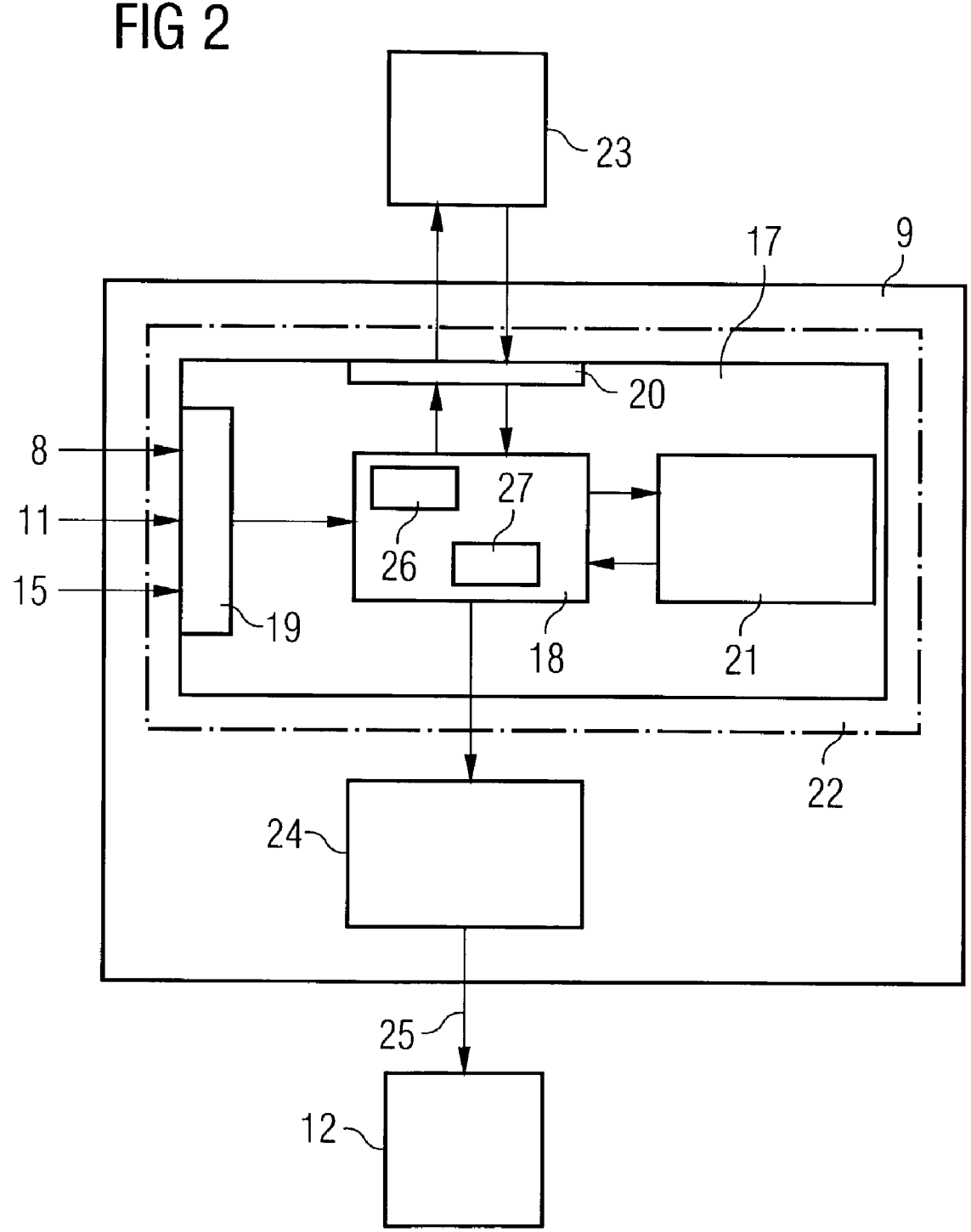
FIG. 2 shows a control unit of the electric power steering system.

The control unit 9 whose basic structure is illustrated in FIG. 2 has, as a core unit, a microcontroller 17. This microcontroller 17 is composed of a microprocessor 18, an A/D converter 19, a diagnostic interface 20 and an NV-RAM 21 which is embodied as a flash memory, these being arranged on a common silicon chip 22.

The microprocessor 18 is connected via the diagnostic interface 20 to a diagnostic device 23 and can exchange data with it bidirectionally. Furthermore, an engine output stage 24, which is connected to the electric motor 12 via a line 25, is arranged outside the microcontroller 17 but within the control unit 9. The lines 8, 11 and 15 lead to the A/D converter 19.

Referring to FIG. 1, the control unit 9 is arranged directly in physical contact with the electric motor 12. This physical contact leads to a situation in which the control unit 9 during the activation of the steering wheel 1 is operated in order to support the steering of the electric motor 12. The dissipated heat which is generated in the process is output directly to the control unit 9 and leads to a change in the chip temperature of the chip 22. In particular when the steering system is stressed, the generation of heat will increase and the molecular movement of the chip is influenced. However, the arrangement of the engine output stage 24 in the control unit 9 already also leads to a generation of heat in the chip 22 owing to the high currents that are necessary to actuate the motor.

If then a new operating program or new operating data is/are to be written into the read/write memory 21 which is embodied as a flash memory, it is necessary to ensure that the data are also retained. For this reason, the microprocessor 18 includes a temperature measuring circuit 26. Before each reprogramming operation, a temperature signal is output to the diagnostic device 23 via the diagnostic interface 20. This diagnostic device 23 evaluates the chip temperature with a maximum flash temperature stored in it. If the measured chip temperature is lower than the maximum flash temperature, the flash operation is initiated and new program data are written into the flash memory. If the diagnostic device 23 determines that the controller chip 22 has exceeded its temperature, flashing is prevented when the maximum flash temperature is exceeded. When very fast interfaces, such as the JTAG interface, for example, are used, it is not possible to prevent the flashing by means of software so that a blocking circuit in the form of a comparator 27 is necessary in the controller circuit 17.

When the microcontroller 17 is arranged in a system which is itself responsible for the dissipated heat which is generated, as in the case of the power steering system which is explained, the microcontroller 17 reduces the actuation of the motor 12 when the chip temperature is exceeded, which actuation is usually carried out in the form of PWM signals. Using a control circuit in which the actual chip temperature is compared with the maximum permitted microcontroller temperature and the PWM signal is set as a function of this comparison, the chip temperature is set to just below the permitted maximum limit for the temperature without the safety-critical system having to be switched off.

However, the invention described can be applied not only to electric power steering systems but also to secondary assemblies which are arranged in the engine cavity. Thus, for example, exactly the same subsequent heating effects are conceivable for water pumps which influence the rotational speed of the motor. Owing to subsequent heating effects, the starting temperature of the microcontroller is very high, so that during the starting operation malfunctions of the microcontroller 17 may occur, which is reliably prevented by the temperature monitoring means. Owing to the method according to the invention, the contradiction between a high chip temperature with respect to the controller temperature which is necessary for the operating condition is reliably set.

What is claimed is:

1. A method for controlling a safety-critical system in a motor vehicle which has a microcontroller, comprising:
    controlling and/or regulating the operating sequences of the safety-critical system in the motor vehicle, the microcontroller composed of a microprocessor and at least one peripheral microprocessor device;
    measuring a temperature of a chip which is provided with the microprocessor and the peripheral unit together during an operating sequence and/or program sequence of the microcontroller and compared with a maximum permitted chip temperature of the microcontroller; and
    controlling the operating sequence and/or program sequence as a function of the temperature comparison, wherein
    the operating sequence and/or program sequence of the microcontroller is interrupted when the maximum chip temperature is exceeded, and
    reprogramming of a flash memory which is arranged on the chip and forms a peripheral microprocessor device is monitored as a function of the chip temperature.

2. The method as claimed in claim 1, wherein the measured chip temperature is supplied to an external evaluation device which carries out the temperature comparison and blocks the operating sequence and/or program sequence of the microcontroller by supplying an external signal.

3. The method as claimed in claim 1, wherein the measured chip temperature on the chip itself is converted into a voltage change, the temperature comparison being carried out in the microcontroller itself.

4. The method as claimed in claim 1, wherein the chip temperature of the microcontroller is set below the maximum chip temperature by regulating the operating sequences of the safety-critical system.

5. The method as claimed in claim 4, wherein when a permitted chip temperature is exceeded, the microcontroller, which is arranged in the direct vicinity of a device, which produces a power loss, actuates the device which produces the power loss, such that the power loss is reduced and the chip temperature is reduced.

* * * * *